United States Patent [19]

Gohara

[11] Patent Number: 5,052,830
[45] Date of Patent: Oct. 1, 1991

[54] PRINTER AND DETACHABLE DEVICE FOR SETTING FUNCTIONS OF THE PRINTER

[75] Inventor: Aijiro Gohara, Tokyo, Japan

[73] Assignee: Seikosha Co., Ltd., Tokyo, Japan

[21] Appl. No.: 560,263

[22] Filed: Jul. 31, 1990

Related U.S. Application Data

[63] Continuation of Ser. No. 284,968, Dec. 15, 1988, abandoned.

[30] Foreign Application Priority Data

Dec. 21, 1987 [JP] Japan .................................. 62-323298
Dec. 21, 1987 [JP] Japan .................................. 62-323299

[51] Int. Cl.$^5$ ............................................. B41J 11/42
[52] U.S. Cl. ...................................... 400/76; 400/477; 400/692
[58] Field of Search .................. 400/76, 121, 477, 692, 400/555, 3

[56] References Cited

U.S. PATENT DOCUMENTS

| | | | |
|---|---|---|---|
| 3,335,298 | 8/1967 | Craig | 200/16 D |
| 4,029,917 | 6/1977 | Webster | 200/16 D |
| 4,168,404 | 9/1979 | Lockard | 200/1 R |
| 4,615,631 | 10/1986 | Ueda | 400/157.3 |
| 4,730,947 | 3/1988 | Ikeda | 400/61 |
| 4,747,710 | 5/1988 | Iwata | 400/690.4 |
| 4,763,281 | 8/1988 | Arakawa | 340/735 |

Primary Examiner—David A. Wiecking
Assistant Examiner—Steven S. Kelley
Attorney, Agent, or Firm—Jordan and Hamburg

[57] ABSTRACT

A printer includes a printer body and a setting device provided with a plurality of switches which are operable for setting various operating functions of the printer. An interconnection on the printer and the setting device is operable to mechanically and electrically interconnect the setting device to the printer and to provide for mechanically and electrically disconnecting the setting device from the printer.

4 Claims, 2 Drawing Sheets

PRINTER AND DETACHABLE DEVICE FOR SETTING FUNCTIONS OF THE PRINTER

This application is a continuation of application Ser. No. 284,968, filed Dec. 15, 1988, now abandoned.

BACKGROUND OF THE INVENTION

Industrial Field of the Invention

This invention relates to printer capable of setting or modifying functions, specification and the like, and also to a setting device for setting or modifying functions and specifications of the printer.

Prior Art and Its Problem

Multi-functions have been used on business printers during recent years. Thus the style of characters to be printed and the line feed pitch can be modified, and emulation and protocol can both be changed externally; however, the functions or specifications must be set or modified every time a computer to which the printer is connected or the application software therefore is changed.

In printers known so far, a multiplicity of switches including a flip switch for setting or modifying such function and the like are disposed fixedly on the back of a printer body or internally; however, since the switches must be considerably miniaturized to conserve space, the operating efficiency of the switches deteriorates. Further coordination of a switch with the particular function cannot be determined at a glance, and when setting or modifying a function or the like, a user is obliged to refer to an operation manual of the printer on every occasion.

OBJECT OF THE INVENTION

Now, therefore, an object of the invention is to provide a printer capable of setting or modifying functions, specification and the like in an easy way and also to provide a function setting device therefore.

MEANS TO SOLVE THE PROBLEM

To attain the aforementioned object, a first embodiment of the invention is characterized in that a group of switches for setting or modifying externally various functions or specifications of a printer are separated from the printer and arranged into one cardlike unit, which is operable for detaching mechanically and connecting electrically to the printer.

A second embodiment is characterized in that a group of switches for setting or modifying externally various functions or specifications of a printer are arranged into one cardlike unit which is operable for connecting electrically to the printer and also extracting from the printer.

The invention will now be described in detail with reference to the accompanying drawings representing one embodiment thereof.

DESCRIPTION OF THE PREFERRED EMBODIMENTS

A printer according to the invention comprises a printer body P and a setting device FC for setting or modifying functions or specifications of the printer body P such as, for example, style of characters printed by the printer body P, line feed pitch of a recording paper, emulation, protocol or the like.

The setting device FC will be described first.

Figure 1:
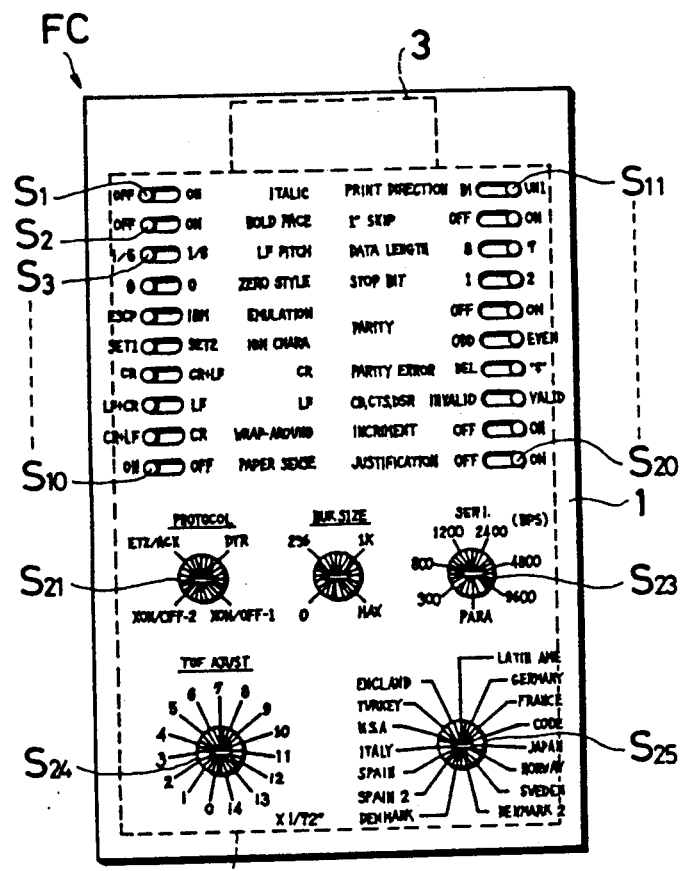
FIG. 1 is a front view of a setting device according to the invention.
Figure 2:
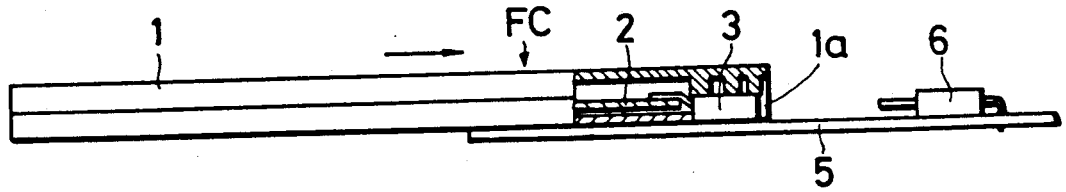
FIG. 2 is a side view, partly in section, showing the setting device together with a control board on a printer body.

As shown in FIG. 1 and FIG. 2, a case 1 of the setting device FC is formed like a flat box, and a multiplicity (25 pcs. in the illustrated embodiment) of switches S1 to S25 are disposed on the top side, the switches S1 to S20 being of the sliding type and the switches S21 to S25 being of the rotary type. The switches S1 to S25 have contact segments (not shown), and the contact segments are contactable with a circuit pattern (not shown) of a circuit board 2 disposed within the case 1. A female connector 3 is connected to an end portion of the circuit board 2, and the connector 3 is exposed externally through a hole 1a formed in an end portion of the case 1. Accordingly, a signal generated by operating the switches S1 to S25 is output to the connector 3 through the circuit board 2.

For deciding the operating condition such as printing mode and the like which are designated on each of the switches S1 to S25, the items are indicated on the upper surface of the case 1 in the form of symbols or abbreviations near each of the switches S1 to S25. Some of the switches S1 to S25 will operate as follows.

Switch S1: Changing whether or not a character is printed in italic.

Switch S2: Changing whether or not a character is printed in itensified style (bold-faced).

Switch S3: Changing whether line feed pitch is specified at 1/6 in. or ⅛.

Switch S11: Changing for one-way printing or two-way printing.

Switch S22: Changing input buffer capacity.

Switch S24: Setting the top margin of the recording paper.

Switch S25: Changing the specified character font for various nations.

Figure 3:
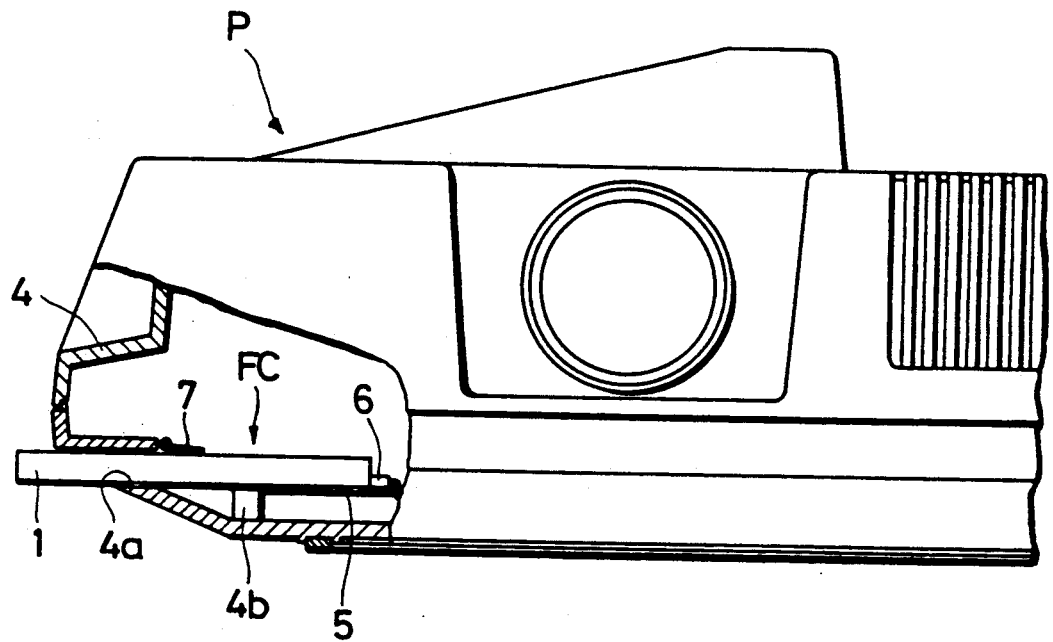
FIG. 3 is a side view, partly in section, showing the state where the setting device is inserted in a printer body.

As shown in FIG. 3, a slot 4a capable of receiving the setting device FC therethrough is formed on the front portion of a housing 4 of the printer body P. A control board 5 in which a control circuit (not shown) for the printer body P is incorporated is disposed within the housing 4, and the control board 5 is fixed on a strut 4b on a bottom portion of the housing 4. A male connector 6 to which the female connector 3 of the setting device FC is detachable is connected on the control board 5.

Accordingly, upon inserting and pushing forward the setting device FC through the slot 4a of the housing 4 of the printer body P, the setting device FC is connected electrically to the control board 5 in which the control circuit of the printer body P is incorporated through the connectors 3, 6, and signals designating various functions and the like on the switches S1 to S25 of the setting device FC are out-put to the control circuit of the printer body.

Then, needless to say, the switches S1 to S25 of the setting device FC can be operated when the setting device FC has been pulled off the printer body P. In the state where the setting device FC is pulled out of the printer body P, the slot 4a of the housing 4 of the printer body P will be screened by a cove 7 supported rotatably within the housing 4.

In the above-described embodiment, the setting device FC is detachable mechanically and connectable electrically to the printer body P through the connector 3, 6; however, a similar effect will be obtainable through a construction wherein the setting device FC is connected to the control board 5 of the printer body P through a flexible cable or the like, and the setting device FC can be extracted from the printer.

EFFECT OF THE INVENTION

As described in detail above, according to the invention, functions and the like of the printer can be set or modified at hand, therefore the work will be considerably simplified, and in case, for example, one printer is used through changing and reconnecting to a plurality of computers, the setting device can be prepared corresponding to each computer, and thus the printer can be modified to specifications or functions appropriate to the computer to which it is connected simply by changing the setting device, thereby coping preferably with the printer user's requirements.

I claim:

1. The combination of a printer and a function selector device for selecting and varying functions of said printer and detachably mountable on said printer, said printer having stored therein information relating to a plurality of line feed modes, carriage-return modes, and a plurality of internally stored selectable character fonts, said function selector device comprising a casing having an outer surface, a plurality of switch means having manually manipulatable operating knobs mounted on said surface of said casing and operable when installed in said printer to execute changing of a plurality of mechanical and electrical multi-choice printer functions including selecting of one of said line feed modes, one of said carriage-return modes, and one of said internally stored selectable character fonts, a circuit board disposed in said casing and connected to said switch means, and casing interconnect means on said casing connected to said circuit board, said printer having printer interconnect means, said casing interconnect means being operable to be mechanically and electrically connected to said printer interconnect means, said switch means being operable to be manually manipulated to effect setting of said multi-choice printer functions while said function selector device is detached from said printer.

2. The combination according to claim 1 wherein said printer comprises a housing having a slot, said function selector device being insertable into said slot.

3. The combination according to claim 2 wherein said slot has a slot opening, said printer housing having a movably mounted cover disposed to cover said slot opening when said function selector device has been withdrawn from said slot.

4. The combination according to claim 1 wherein said printer comprises a cover having a slot, said function selector device being insertable into said slot with at least some of said switch means being disposed in said slot when said function selector device is mechanically and electronically interconnected to said printer.

* * * * *